(12) United States Patent
Osborn

(10) Patent No.: US 11,628,924 B2
(45) Date of Patent: Apr. 18, 2023

(54) PARAMOTOR THROTTLE LOCKING APPARATUS

(71) Applicant: Pierce Osborn, Ellabell, GA (US)

(72) Inventor: Pierce Osborn, Ellabell, GA (US)

( * ) Notice: Subject to any disclaimer, the term of this patent is extended or adjusted under 35 U.S.C. 154(b) by 0 days.

(21) Appl. No.: 16/946,121

(22) Filed: Jun. 6, 2020

(65) Prior Publication Data

US 2021/0380222 A1   Dec. 9, 2021

(51) Int. Cl.
*B64C 13/04* (2006.01)
*B64D 33/02* (2006.01)
*B64C 31/036* (2006.01)

(52) U.S. Cl.
CPC .......... *B64C 13/042* (2018.01); *B64C 31/036* (2013.01); *B64D 33/02* (2013.01); *B64D 2033/0253* (2013.01)

(58) Field of Classification Search
CPC ..... B64C 13/042; B64C 31/036; B64D 33/02; B64D 2033/0253; G05G 1/04; F16C 1/10
See application file for complete search history.

(56) References Cited

U.S. PATENT DOCUMENTS

| | | | | |
|---|---|---|---|---|
| 3,845,847 A | * | 11/1974 | Camp | B60W 30/18 477/204 |
| 4,134,560 A | * | 1/1979 | Messerschmidt | B64C 27/58 244/17.25 |
| 4,819,896 A | * | 4/1989 | Narad | B64C 27/56 244/220 |
| 4,916,967 A | * | 4/1990 | Nakamura | B62K 23/06 74/489 |
| 7,628,094 B2 | * | 12/2009 | Owyang | B62M 25/02 74/500.5 |
| 2004/0140108 A1 | * | 7/2004 | Yamazaki | A01B 33/028 172/42 |
| 2004/0149457 A1 | * | 8/2004 | Yamazaki | B62D 51/04 172/42 |
| 2006/0054735 A1 | * | 3/2006 | Li | B63H 11/04 244/4 A |
| 2006/0070246 A1 | * | 4/2006 | McKnight | A01G 23/091 30/296.1 |
| 2007/0266817 A1 | * | 11/2007 | Lassiter | B62K 21/26 74/551.8 |
| 2008/0047388 A1 | * | 2/2008 | Lachance | B62K 23/04 74/526 |
| 2008/0180272 A1 | * | 7/2008 | Scherer | A63H 30/04 340/13.24 |
| 2012/0025406 A1 | * | 2/2012 | Bellandi | B05B 12/0022 261/62 |
| 2013/0091973 A1 | * | 4/2013 | Kato | F02D 11/02 74/483 R |

(Continued)

*Primary Examiner* — Assres H Woldemaryam
(74) *Attorney, Agent, or Firm* — Johnson, Marcou, Isaacs & Nix, LLC

(57) ABSTRACT

The invention described and claimed in this application is a throttle assembly for a paramotor with an integrated locking mechanism which can be engaged to lock the throttle input in any position to maintain level flight. The throttle locking mechanism can be quickly disengaged as needed by squeezing the throttle control lever. The throttle locking mechanism is also able to be tuned when in the locked position as to attain the ideal engine input for level flight. The throttle locking mechanism can be preset and quickly returned to a designated power setting.

19 Claims, 11 Drawing Sheets

(56) References Cited

U.S. PATENT DOCUMENTS

| | | | |
|---|---|---|---|
| 2013/0098195 A1* | 4/2013 | Thielvoldt | G05G 1/04 |
| | | | 74/502.2 |
| 2015/0183321 A1* | 7/2015 | Lefebvre | F02D 9/10 |
| | | | 180/334 |
| 2018/0279548 A1* | 10/2018 | Goman | A01D 34/475 |
| 2019/0075726 A1* | 3/2019 | White | A01D 34/824 |

* cited by examiner

PARAMOTOR THROTTLE LOCKING APPARATUS

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to a paramotor, also known as a powered paraglider, which is an ultralight aircraft consisting of an air-inflated wing attached to a motorized frame; the motor drives a propeller, which generates thrust, and the wing generates the lift necessary for the system to fly.

The forward speed of the paramotor is controlled by the wing, while the altitude is controlled by the thrust generated from the motor. High thrust results in altitude gain, while low thrust results in altitude loss. There is a mid-range thrust which allows the paramotor to maintain level flight. Many factors determine how much thrust is needed to maintain level flight, including but not limited to overall paramotor weight, engine size, wing type, and environmental conditions.

The thrust generated by the engine is controlled by the pilot using a hand-held throttle assembly. The throttle assembly consists of a grip, throttle lever, and control cable. The grip is strapped to the pilot's hand, and the pilot uses his or her fingers to squeeze the throttle lever. The throttle lever pulls on the control cable, which gives an input to the motor to control the speed of the propeller, generating thrust.

When the pilot is in flight and wants to maintain the current altitude, he or she must squeeze the throttle lever to find the appropriate mid-range thrust from the engine, then continue to manually hold the throttle lever at that position. This leads to fatigue and discomfort in the pilot's hand.

Improved designs have an added thumb screw on the side of the throttle assembly. The thumb screw acts as a clamp; when tightened, the throttle lever becomes locked in its current position, allowing the pilot to release the throttle lever while the paramotor engine continues to generate the desired thrust.

There are several disadvantages with the thumb screw locking throttle assembly. The locking mechanism must be manually unscrewed to free the throttle lever from the locked position, requiring two hands to accomplish the task. This creates an unsafe condition where the pilot cannot quickly disengage the throttle locking mechanism.

The thumb screw is also prone to being under-torqued or over-torqued. Under-torquing leads to the throttle lever slipping over time, causing the engine to reduce thrust and the paramotor to lose altitude. Over-torquing causes the pilot to be unable to release the locking mechanism.

The thumb screw locking mechanism does not allow for fine adjustments while the throttle lever is locked; therefore, the entire system must be reset if slightly more or less thrust is desired.

The thumb screw locking mechanism is also unable to quickly reengage a desired preset thrust level without bringing the engine to the exact thrust level and then manually tightening the thumb screw.

There remains a need for a paramotor throttle with an integrated locking mechanism capable of rapid disengagement, fine in-flight adjustments, and quickly engaging a preset thrust level.

SUMMARY OF THE INVENTION

The general purpose of the present invention is to provide paramotor pilots with a throttle assembly with an integrated mechanism able to lock the throttle input to the engine at any desired level, adjust the throttle input while the mechanism is locked, rapidly disengage the locking mechanism, and quickly reengage the locking mechanism to a preset thrust level.

To attain this, the present invention generally comprises of a grip where the pilot's hand is strapped; a throttle lever, which is manually actuated by the pilot's fingers and used to add tension to a cable, which gives an input to the engine to generate the thrust of the paramotor; a spring-loaded pivoting throttle lock connected to the throttle lever, which the pilot will manually actuate to lock the throttle input; an adjustable catch, which interacts with the throttle lock to keep the throttle lever locked in position; and an adjustment knob, which is used by the pilot to tune the throttle locking mechanism to the desired level.

It is an object of the present invention to provide a mechanism which locks the throttle input to the engine, allowing the pilot to release grip of the throttle lever while the aircraft engine continues to generate the desired thrust level.

It is another object of the present invention that, while the throttle locking mechanism is engaged, the pilot can make incremental adjustments to the power generated by the motor without needing to reset the system.

It is another object of the present invention that the throttle locking mechanism can be rapidly disengaged by squeezing the throttle lever.

It is another object of the present invention that the pilot can quickly reset the throttle locking mechanism to the preset thrust level after the mechanism has been disengaged.

DETAILED DESCRIPTION

With reference to FIG. 1 through 11, a new apparatus embodying the principles and the concepts of the present invention will be referred to as the throttle assembly and referenced by numeral 1.

Figure 1:
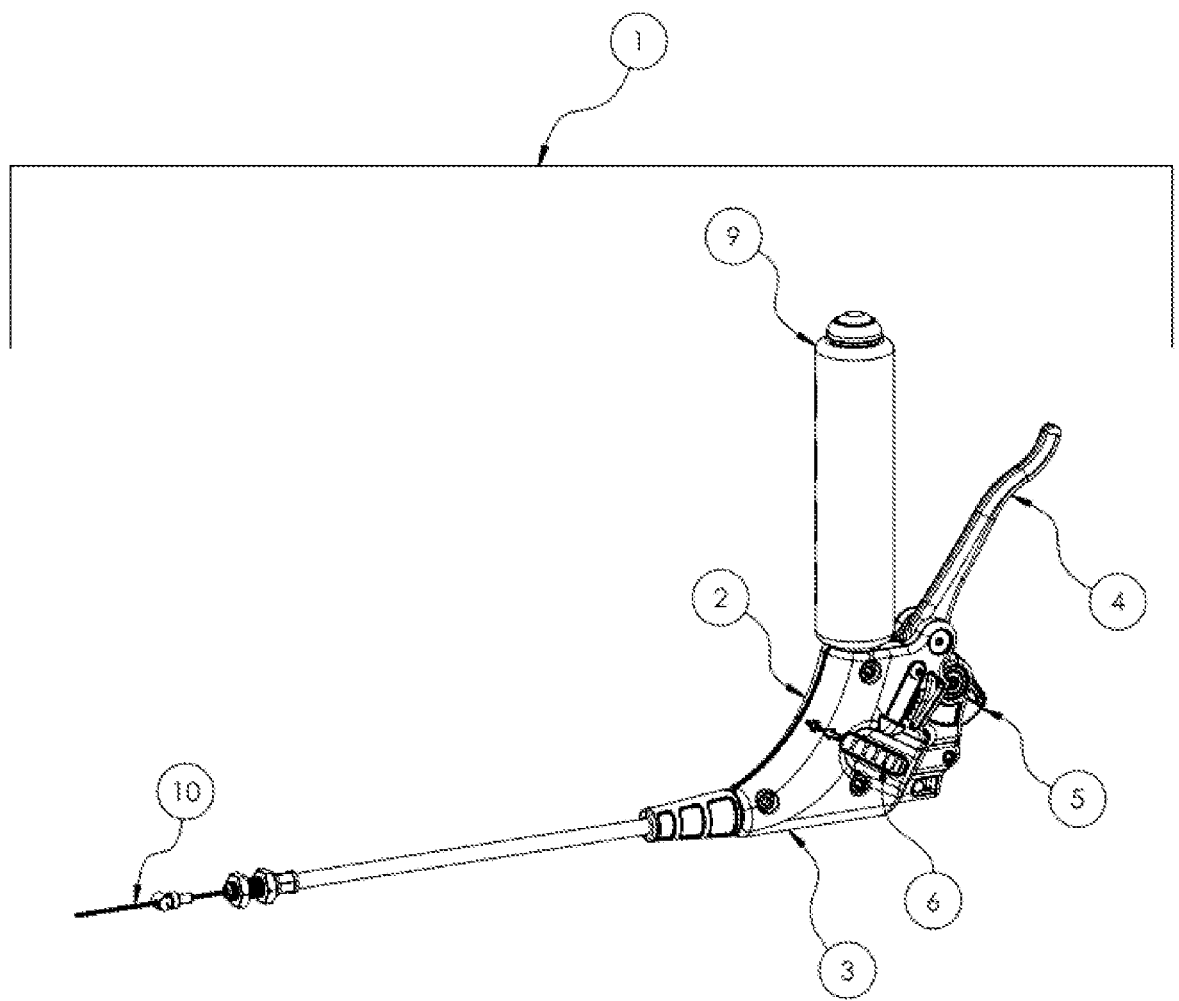
FIG. 1 is an isometric view of a throttle assembly containing the present invention.

As shown in FIG. 1: The present invention, referred to as the throttle assembly 1, comprises of a left side housing 2, a right side housing 3, throttle control lever 4, throttle lock 5, adjustment wheel 6, grip 9, and control cable 10. The left side housing 2 and right side housing 3 retain the main working components of the proposed invention. The control cable 10 runs along the bottom of the throttle assembly 1 and is used to give an input to the motor.

Figure 2:
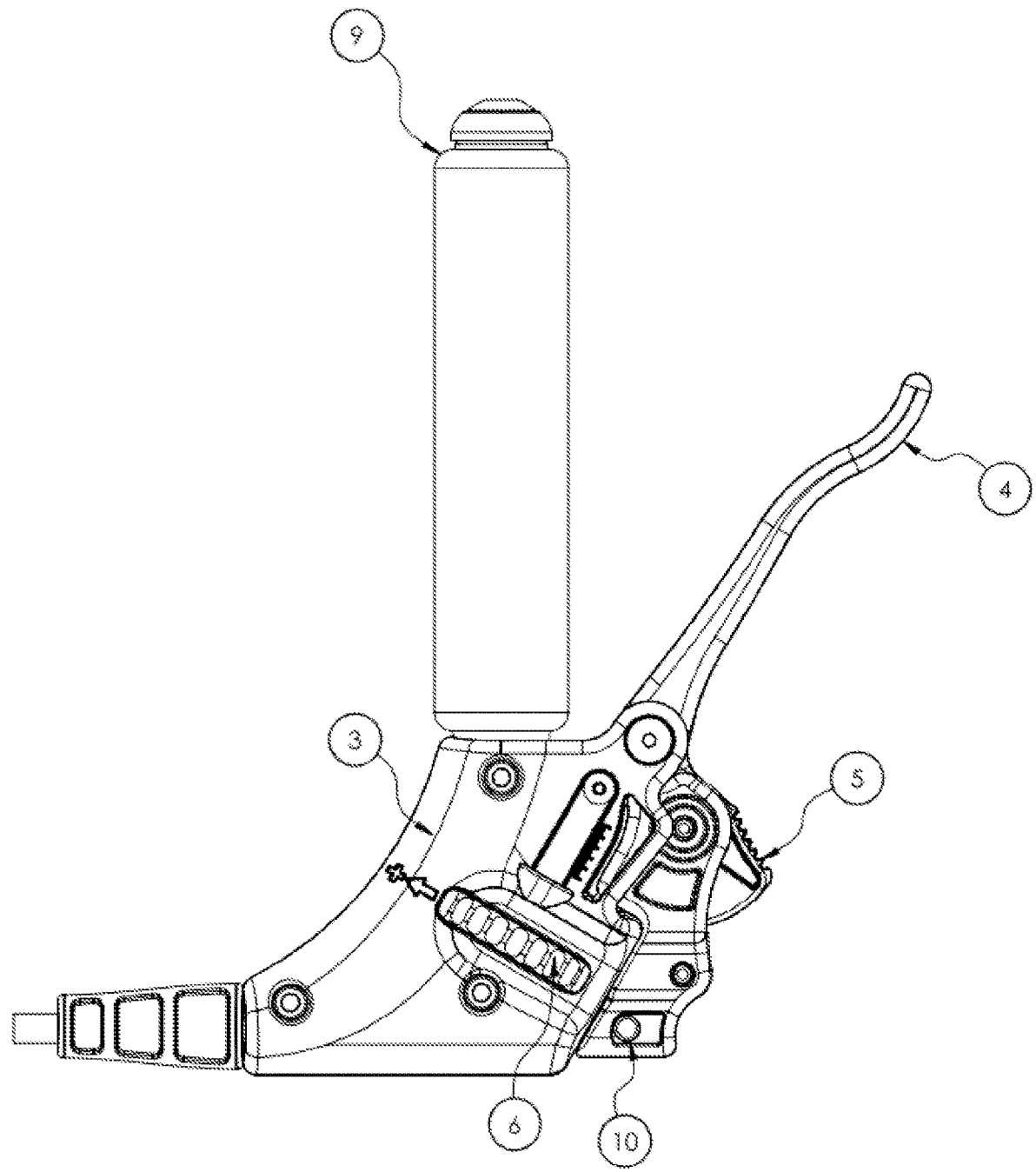
FIG. 2 is a right-hand view of a throttle assembly containing the present invention.

As shown in FIG. 2: The grip 9 is attached between the left side housing 2 (not shown) and right side housing 3. The throttle control lever 4 is attached between the left side housing 2 (not shown) and right side housing 3 and pivots about a center axis. The throttle lock 5 is attached to the throttle control lever 4 and pivots about a center axis. It contains a spring 11 (internal), biasing the throttle lock 5 to a neutral position. The adjustment wheel 6 is housed between left side housing 2 (not shown) and right side housing 3 and rotates about a center axis. The helical guide rod 8 (internal) is attached to the center of the adjustment wheel 6 and rotates with the adjustment wheel 6. The adjustable catch 7 (internal) is threaded over the helical guide rod 8 (internal) and moves along the helical guide rod 8 (internal) threads as the adjustment wheel 6 rotates. The control cable 10 runs perpendicular to the grip 9 at the bottom of the throttle assembly 1 and is connected to the bottom of the throttle control lever 4.

Figure 3:
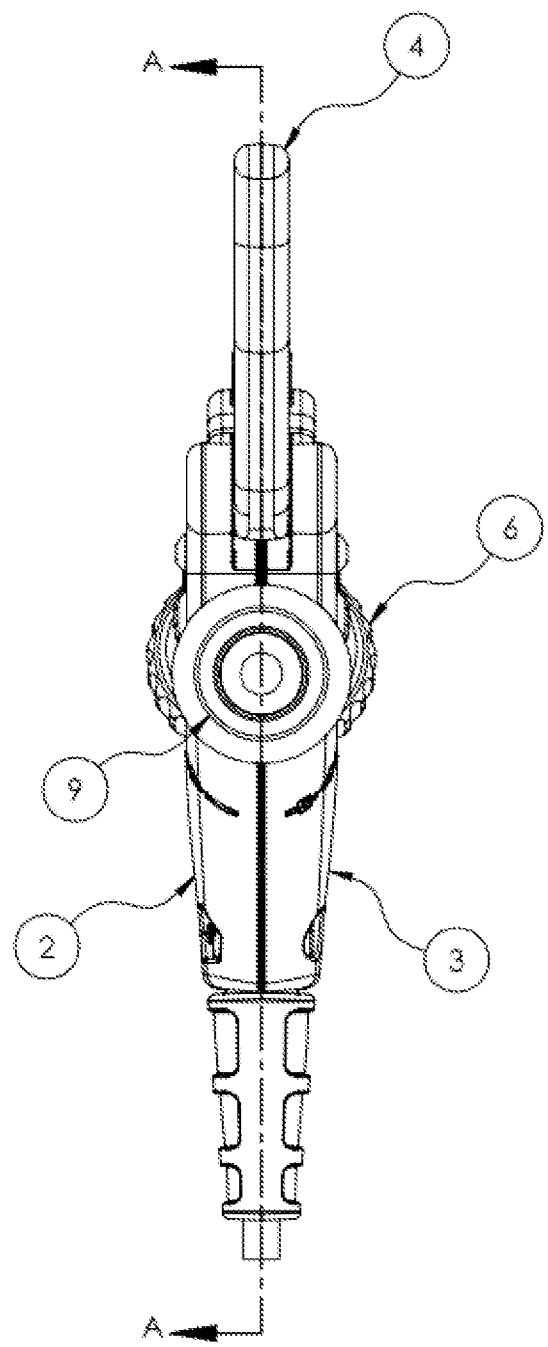
FIG. 3 is a top view of a throttle assembly containing the present invention, defining cutting line A-A.

As shown in FIG. 3: A top view of the throttle assembly 1 defining the cutting line A-A used to generate the view for FIG. 4, FIG. 6, FIG. 7, FIG. 8, FIG. 10 and FIG. 11.

Figure 4:
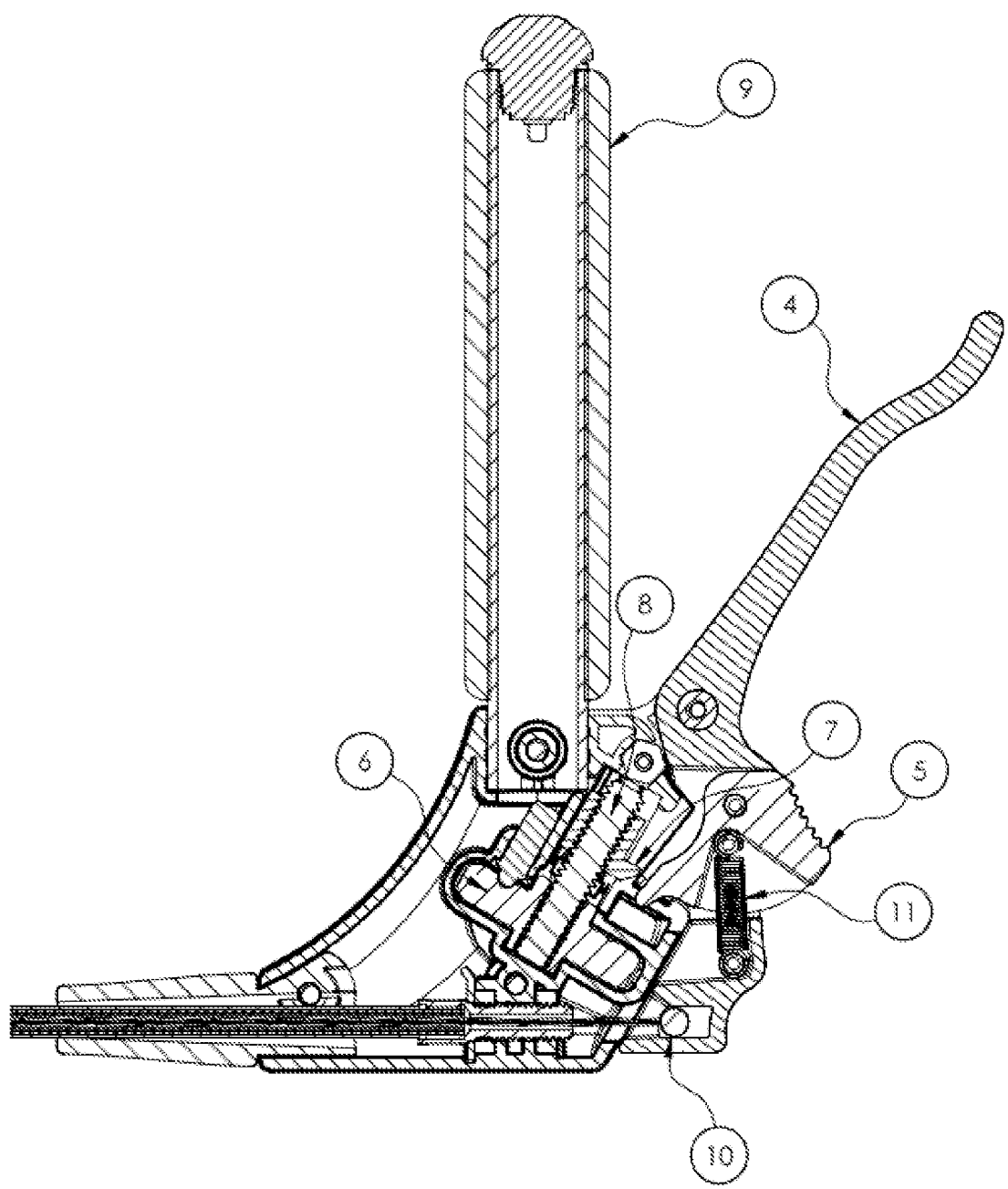
FIG. 4 is a cross-sectional view of a throttle assembly as defined by line A-A on FIG. 3.

As shown in FIG. 4: A cross-sectional view defined by cutting line A-A in FIG. 3, the internal components of the throttle assembly 1 showing the adjustable catch 7, helical guide rod 8 and spring 11.

Figure 5:
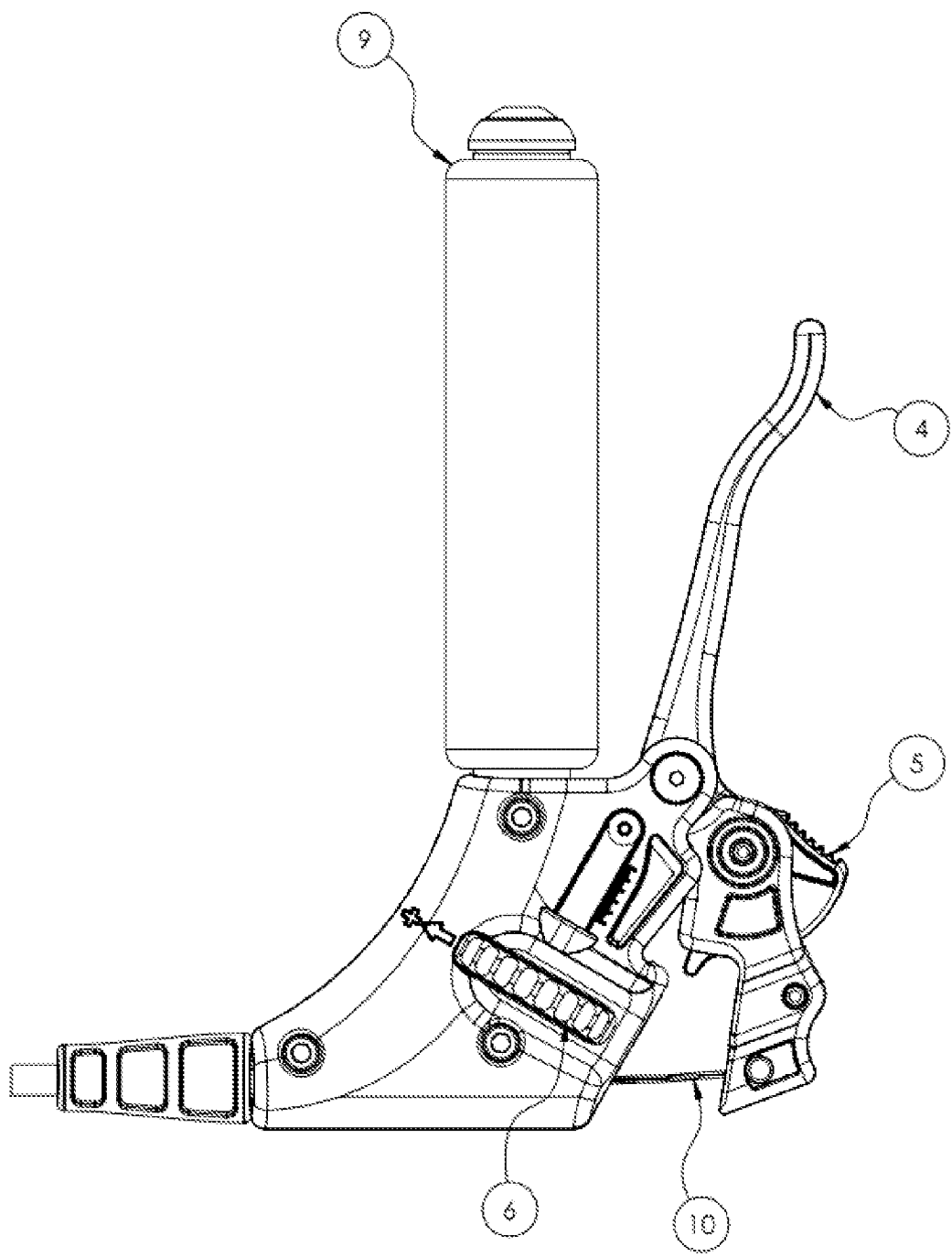
FIG. 5 is a right-hand view of a throttle assembly with the throttle lever actuated.

As shown in FIG. 5: In practice, the grip 9 is strapped to or held in the pilot's hand and the pilot will use his or her fingers to squeeze the upper half of the throttle control lever 4. This will cause the throttle control lever 4 to pivot about its center axis, causing the lower side of the throttle control lever 4 to push away from the rest of the throttle assembly 1. When the throttle control lever 4 is squeezed, it pulls on the control cable 10, which is connected to the lower section of the throttle control lever 4. This gives an input to the engine and causes the engine to generate power. In this way, the present invention can operate in the same manner as a conventional paramotor throttle assembly.

Figure 6:
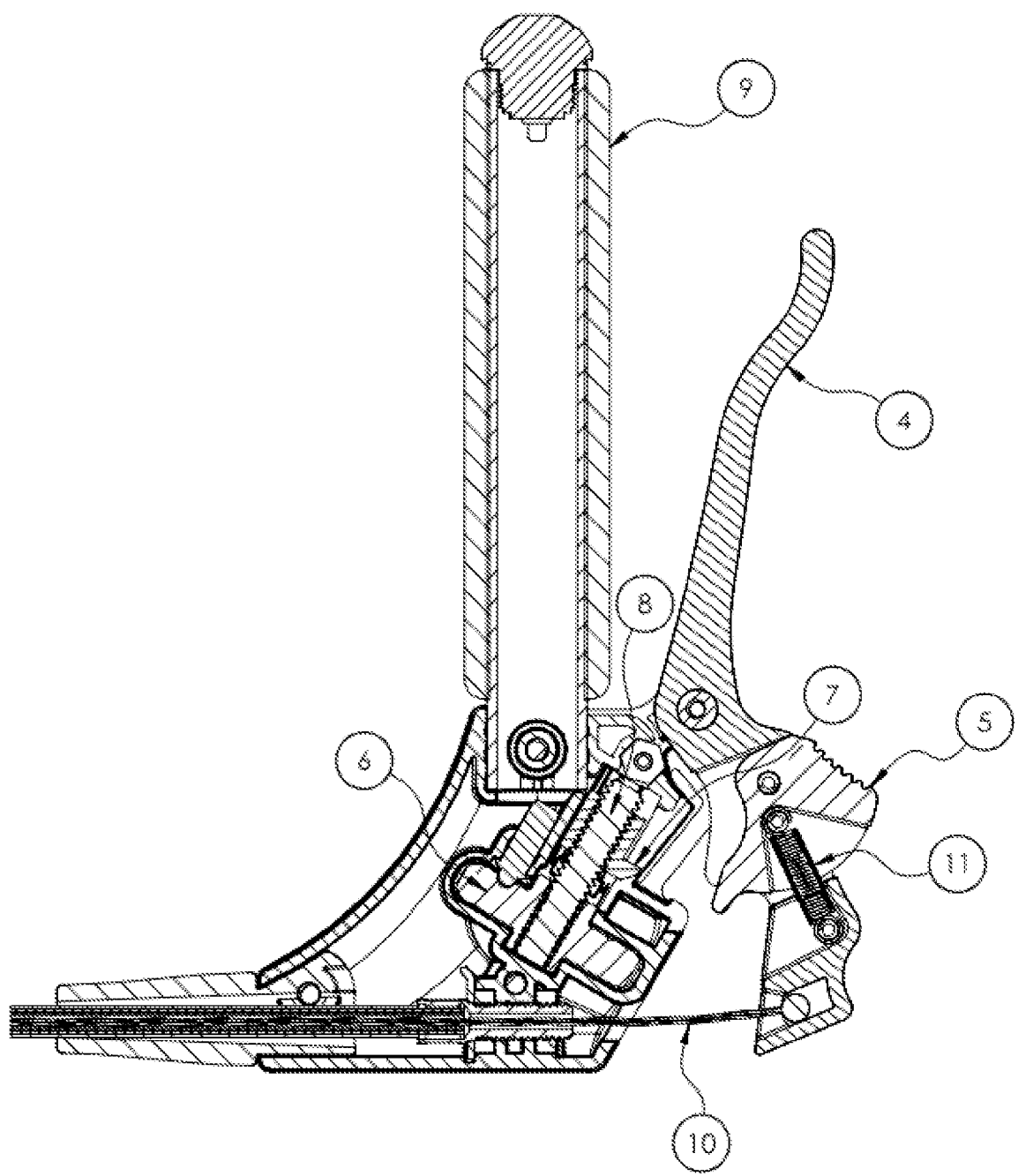
FIG. 6 is a cross-sectional view of a throttle assembly as defined by line A-A on FIG. 3 with the throttle lever actuated.

As shown in FIG. 6: When the throttle control lever 4 is squeezed as shown in FIG. 5, the throttle lock 5 will rotate with the throttle control lever 4 because it is held in place by the spring 11.

Figure 7:
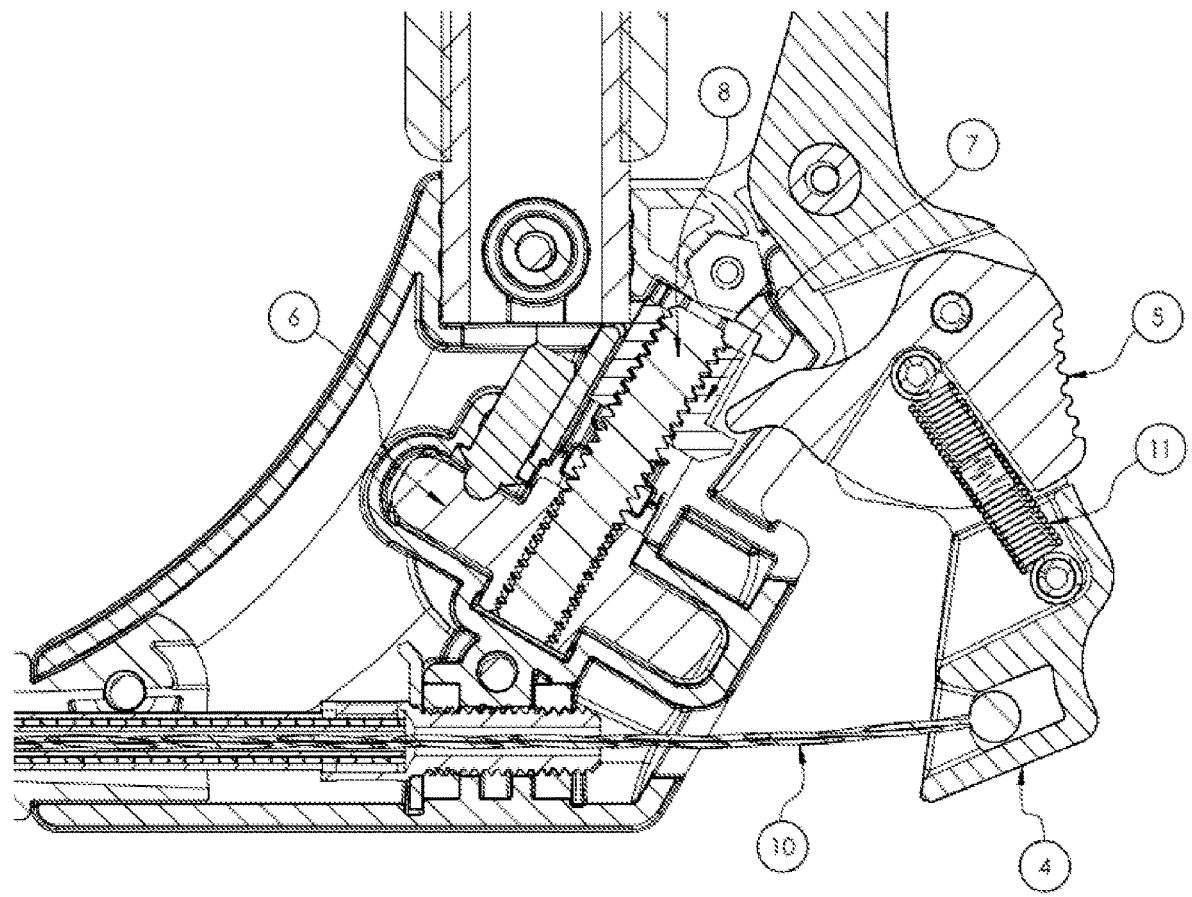
FIG. 7 is a cross-sectional view of a throttle assembly as defined by line A-A on FIG. 3 with the throttle lever actuated and the throttle lock pressed.

As shown in FIG. 7: On the present invention, when the throttle control lever 4 is being squeezed as shown in FIG. 5 and FIG. 6, the pilot can press the throttle lock 5, causing it to pivot about a center axis. The tip of the throttle lock 5 will move past the ledge of the adjustable catch 7.

Figure 8:
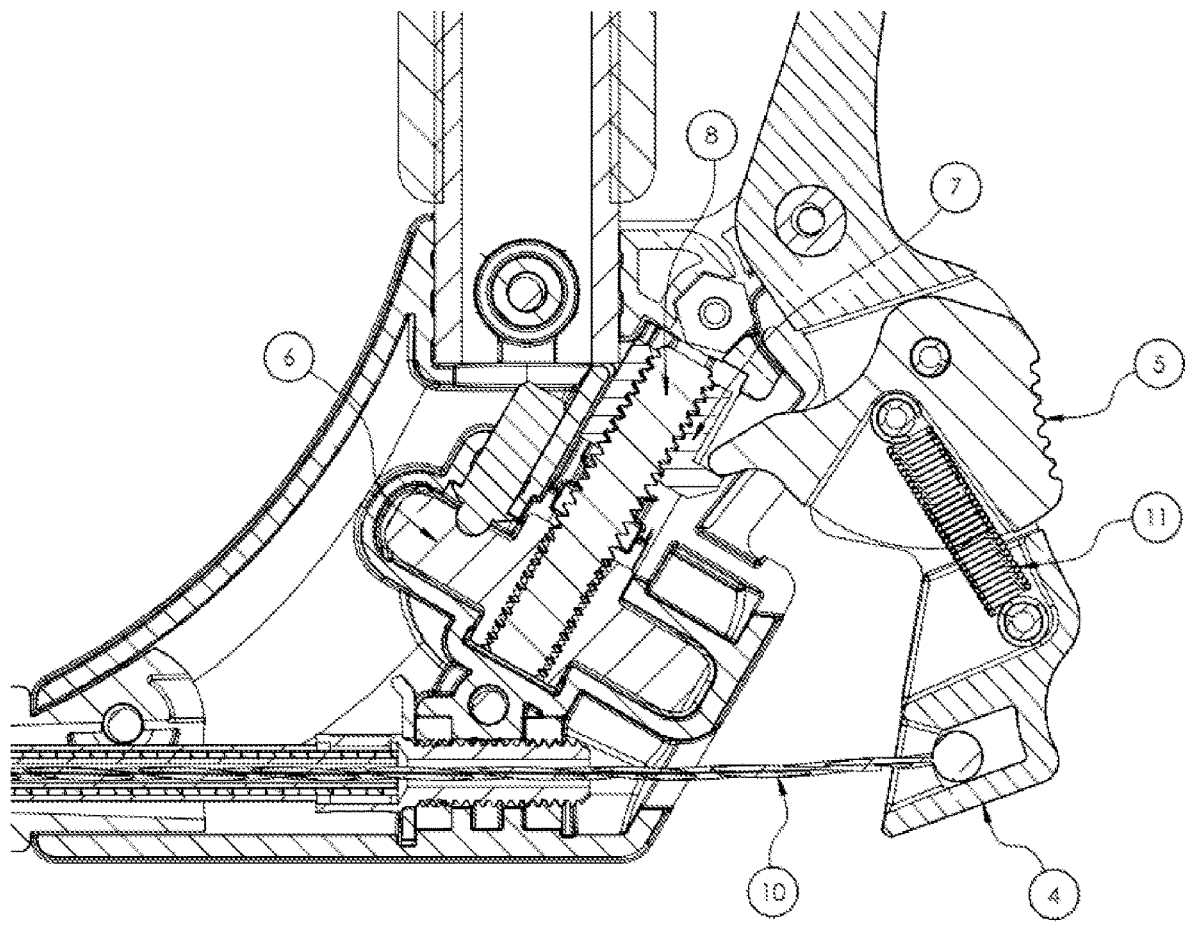
FIG. 8 is a cross-sectional view of a throttle assembly as defined by line A-A on FIG. 3 with the throttle lock engaged with adjustable catch.

As shown in FIG. 8: After the pilot moves the throttle lock 5 as shown in FIG. 7, the pilot can release pressure on the throttle control lever 4. The force of the control cable 10 will pull the throttle control lever 4 inward, but the adjustable catch 7 will not allow the throttle lock 5 to pivot out of the way, causing the system to be locked in its current position. This will keep constant tension on the control cable 10 and cause the engine to generate the preset thrust level.

Figure 9:
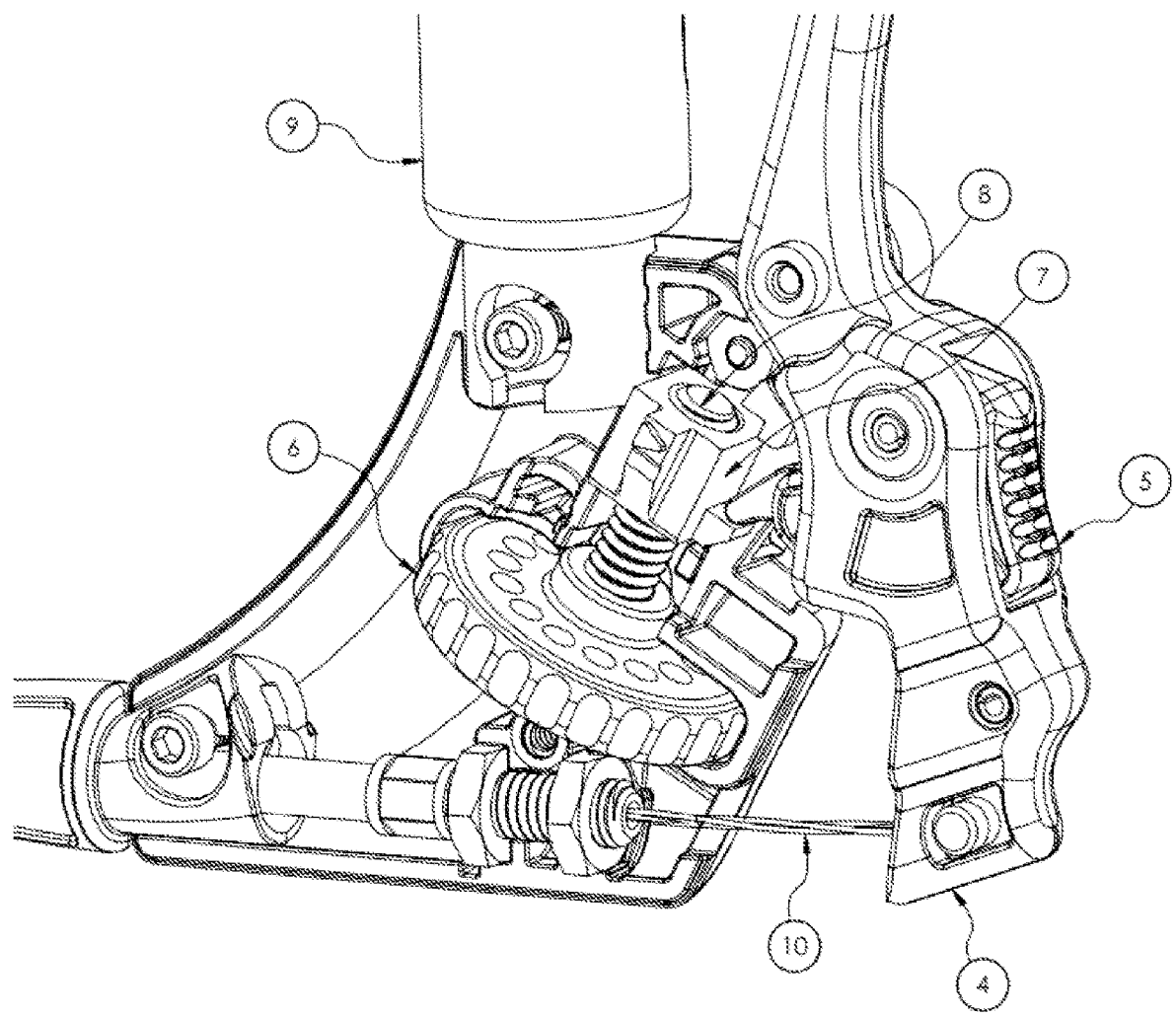
FIG. 9 is an isometric view of a throttle assembly with right side housing 3 hidden illustrating the relation between the adjustment wheel, adjustable catch, helical guide rod, throttle lock, and throttle lever.

As shown in FIG. 9: In the locked position, the adjustment wheel 6 can be rotated, causing the helical guide rod 8 to rotate as well. The rotation of the helical guide rod 8 causes the adjustable catch 7, which rides on the threads, to rise or fall depending on the direction the adjustment wheel rotates. A clockwise rotation of the adjustment wheel 6 will cause the adjustable catch 7 to rise, causing the throttle lock 5 to push up on the throttle control lever 4; in turn, this causes the control cable 10 to be pulled tighter, increasing the output of the motor. A counter-clockwise rotation of the adjustment wheel 6 will cause the adjustable catch 7 to be lowered, causing the throttle lock 5 to pull inward on the throttle control lever 4; this causes the control cable 10 to be retracted, decreasing the output of the motor. In this way, fine adjustments can be made to the motor output so the system can be adjusted to find the ideal thrust level to suit the pilot's needs.

Figure 10:
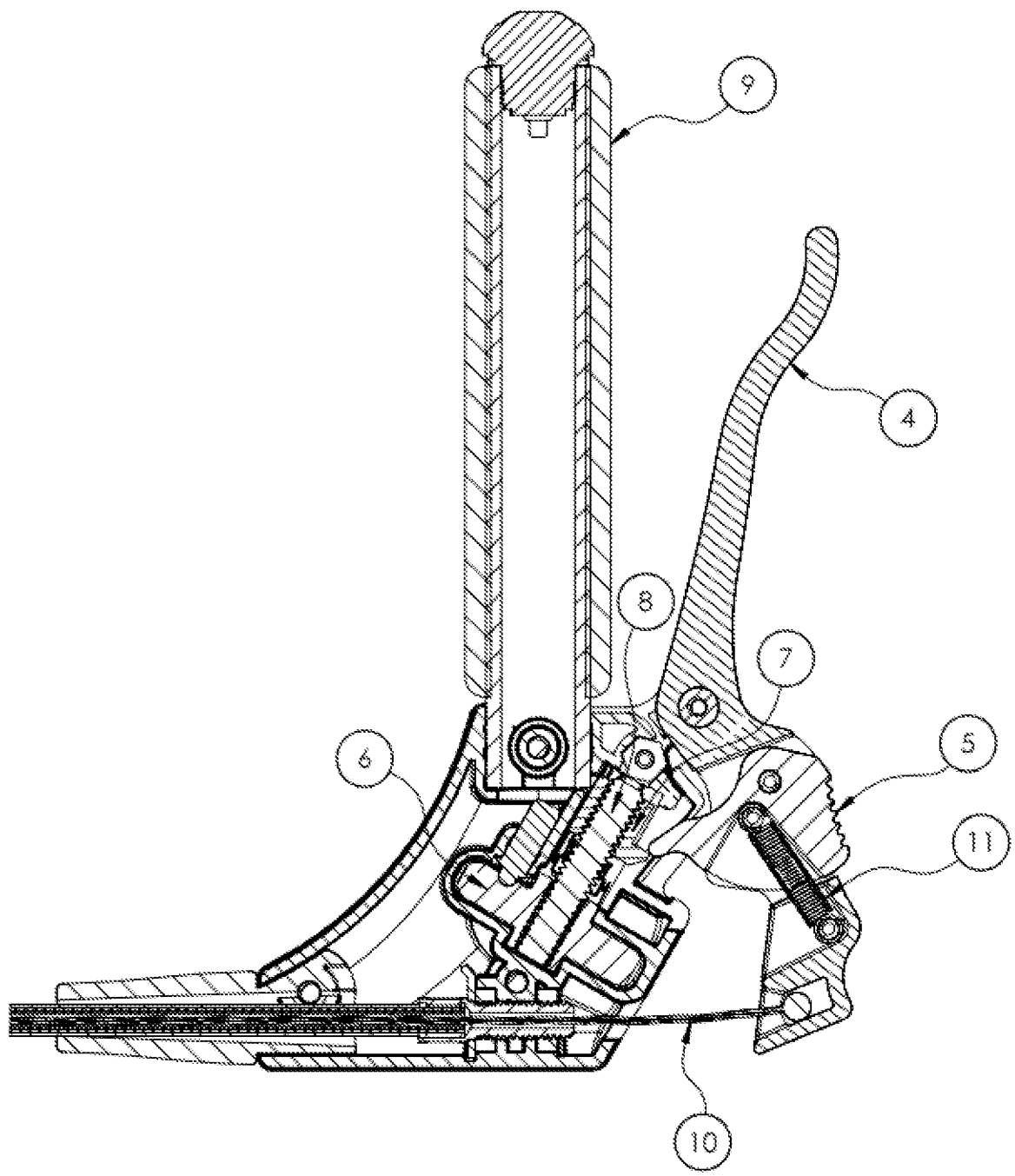
FIG. 10 is a cross-sectional view of a throttle assembly as defined by line A-A on FIG. 3 demonstrating how squeezing the throttle lever will disengage the throttle locking mechanism.

As shown in FIG. 10: When the throttle control lever 4 is pressed by the pilot, the throttle control lever 4 pulls the throttle lock 5 away from the adjustable catch 7 until the tip of the throttle lock 5 is pulled past the ledge of the adjustable catch 7. Now freely able to move, the throttle lock 5 is pulled by the spring 11 and no longer interferes with the adjustable catch 7. This action creates a way to rapidly disengage throttle lock 5.

Figure 11:
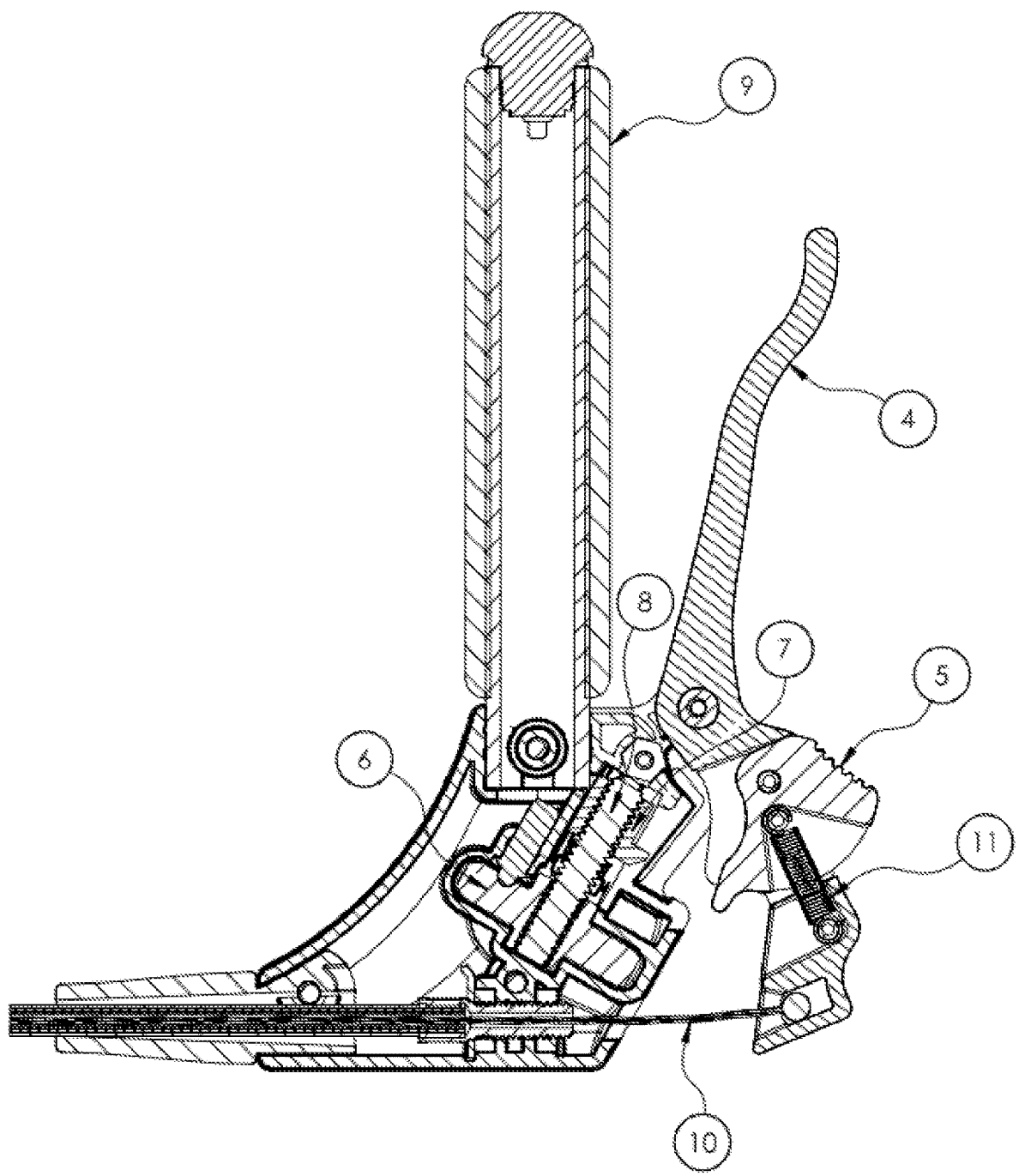
FIG. 11 is a cross-sectional view of a throttle assembly as defined by line A-A on FIG. 3 showing the adjustable catch remaining in the preset position after the throttle locking mechanism has been disengaged.

As shown in FIG. 11: When the throttle lock 5 is disengaged, the adjustable catch 7 remains in the last used position, allowing it to be re-engaged quickly to the previous thrust setting without the need to make any additional fine adjustments.

The configurations of all components of the throttle assembly 1 may vary in shape, location, material, manufacturing method, and operation of use. The adjustable catch 7 may vary depending on the method in which it is driven to travel. In addition, the adjustment wheel 6 and helical guide rod 8 may differ in method used to drive the adjustable catch 7. The adjustment wheel 6 and helical guide rod 8 may also be combined into a single piece. The throttle lock 5 may vary in actuation method.

As stated above, to achieve optimal dimensional relationships for the parts of the present invention, there may be variations in size, materials, shape, form, function, manner of operation, assembly, and use. Any alternatives, modifications, and variations equivalent to those described here and illustrated in the figures are intended to be encompassed by the present invention, as they fall within the broad scope of the attached claims.

I claim:

1. A throttle control assembly of a paramotor, comprising;
   a throttle control lever having a first end and a second end and being pivotable around a pivot point between the first end and the second end, the second end configured to attach to a control cable attached to a motor of a paramotor, movement of the first end of throttle control lever around the pivot point causing corresponding movement of the second end of the throttle control lever around the pivot point to thereby correspondingly change tension on the control cable and to correspondingly change an output of the motor attached to the control cable;

a throttle lock coupled to the throttle control lever and movable between a resting position and a locking position; and an adjustable catch that engages the throttle lock when the throttle lock is disposed in the locking position to hold the throttle control lever in a fixed position around the pivot point, the fixed position of the throttle control lever providing a corresponding output of the motor connected thereto via the cable.

2. The throttle control assembly of claim 1, wherein the adjustable catch is moveable relative to the throttle lock with different positions of the adjustable catch holding the throttle lock in a different position relative to the pivot point of the throttle control lever to thereby correspondingly change the fixed position of the throttle control lever around the pivot point, each change of the fixed position of the throttle control lever providing a corresponding output of the motor connected thereto via the cable.

3. The throttle control assembly of claim 2, wherein the adjustable catch is adjustable while engaging the throttle lock in the locked position to change the output of the motor by correspondingly rotating the throttle control lever around the pivot point.

4. The throttle control assembly of claim 1, wherein movement of the throttle control lever around the pivot point in a direction that moves the throttle lock away from the adjustable catch causes the throttle lock to disengage from the adjustable catch.

5. The throttle control assembly of claim 4, wherein returning the throttle lock to the locking position and reengaging the throttle lock with the adjustable catch returns to the throttle control lever to the previous fixed position existing prior to disengaging the throttle lock from the adjustable catch.

6. The throttle control assembly of claim 1, the adjustable catch comprising:
a catch member comprising a tubular shape comprising threads on an internal portion of the tubular shape, the catch member further comprising a ledge extending from the catch member to engage the throttle lock;
a guide rod comprising corresponding threads that mate with the threads of the catch member; and
an adjustment knob coupled to the guide rod, wherein rotation of the adjustment knob rotates the guide rod internally to the catch member to move the catch member along the guide rod via the corresponding threads of the guide rod and the catch member.

7. The throttle control assembly of claim 1, further comprising a spring attached to the throttle control lever and the throttle lock to bias the throttle lock to the resting position.

8. The throttle control assembly of claim 1, further comprising the cable coupled to the second end of the throttle control lever.

9. The throttle control assembly of claim 8, further comprising the motor coupled to the cable.

10. The throttle control assembly of claim 1, further comprising a grip coupled to the assembly, wherein movement of the first end of the throttle control lever toward the grip provides a corresponding increase in the output of the motor, and movement of the first end of the throttle control lever away from the grip provides a corresponding decrease in the output of the motor.

11. The throttle control assembly of claim 10, further comprising a strap coupled to the assembly, the strap configured to attached to a hand of a user to hold the assembly to the user's hand.

12. A throttle control assembly of a paramotor, comprising:
a throttle control lever having a first end and a second end and being pivotable around a pivot point between the first end and the second end, the second end configured to attach to a control cable attached to a motor of a paramotor, movement of the first end of throttle control lever around the pivot point causing corresponding movement of the second end of the throttle control lever around the pivot point;
a throttle lock coupled to the throttle control lever and movable between a resting position and a locking position; and
an adjustable catch that engages the throttle lock when the throttle lock is disposed in the locking position to hold the throttle control lever in a fixed position around the pivot point.

13. The throttle control assembly of claim 12, wherein the adjustable catch is moveable relative to the throttle lock with different positions of the adjustable catch holding the throttle lock in a different position relative to the pivot point of the throttle control lever to thereby correspondingly change the fixed position of the throttle control lever around the pivot point.

14. The throttle control assembly of claim 13, wherein the adjustable catch is adjustable while engaging the throttle lock in the locked position to correspondingly rotate the throttle control lever around the pivot point.

15. The throttle control assembly of claim 12, wherein movement of the throttle control lever around the pivot point in a direction that moves the throttle lock away from the adjustable catch causes the throttle lock to disengage from the adjustable catch, and wherein returning the throttle lock to the locking position and reengaging the throttle lock with the adjustable catch returns to the throttle control lever to the previous fixed position existing prior to disengaging the throttle lock from the adjustable catch.

16. The throttle control assembly of claim 12, the adjustable catch comprising:
a catch member comprising a tubular shape comprising threads on an internal portion of the tubular shape, the catch member further comprising a ledge extending from the catch member to engage the throttle lock;
a guide rod comprising corresponding threads that mate with the threads of the catch member; and
an adjustment knob coupled to the guide rod, wherein rotation of the adjustment knob rotates the guide rod internally to the catch member to move the catch member along the guide rod via the corresponding threads of the guide rod and the catch member.

17. The throttle control assembly of claim 12, further comprising a spring attached to the throttle control lever and the throttle lock to bias the throttle lock to the resting position.

18. The throttle control assembly of claim 12, further comprising the cable coupled to the second end of the throttle control lever.

19. The throttle control assembly of claim 12, further comprising:
a grip coupled to the assembly, wherein movement of the first end of the throttle control lever toward the grip provides a corresponding increase in the output of the motor, and movement of the first end of the throttle control lever away from the grip provides a corresponding decrease in the output of the motor; and a strap coupled to the assembly, the strap configured to attached to a hand of a user to hold the assembly to the user's hand.

* * * * *